United States Patent [19]
Genuit

[11] 3,971,975
[45] July 27, 1976

[54] SWITCHING REGULATOR EMPLOYING BIASED SATURABLE CORE REACTORS

[75] Inventor: Luther L. Genuit, Scottsdale, Ariz.

[73] Assignee: Honeywell Information Systems, Inc., Phoenix, Ariz.

[22] Filed: June 26, 1975

[21] Appl. No.: 590,541

[52] U.S. Cl. .................................. 321/18; 321/2; 321/10
[51] Int. Cl.² .................................. H02M 3/315
[58] Field of Search .............. 321/2, 43–45 R, 321/18

[56] References Cited
UNITED STATES PATENTS

| | | |
|---|---|---|
| 3,518,526 | 6/1970 | Genuit .................................. 321/2 |
| 3,526,823 | 9/1970 | Genuit .......................... 321/45 R X |
| 3,573,597 | 4/1971 | Genuit et al. ...................... 321/45 R |
| 3,829,755 | 8/1974 | Nowell .................................... 321/2 |

*Primary Examiner*—William M. Shoop
*Attorney, Agent, or Firm*—David A. Frank

[57] ABSTRACT

A switching regulator for high current, low voltage applications includes at least one pair of biased saturable core transformers to achieve improved duty-cycle and reduced rectifier currents. Advantageously, a single bias choke may be employed with a plurality of transformer pairs.

7 Claims, 4 Drawing Figures

SWITCHING REGULATOR EMPLOYING BIASED SATURABLE CORE REACTORS

FIELD OF THE INVENTION

This invention relates generally to power supplies and more particularly to power supplies of a switching regulator type.

BACKGROUND OF THE INVENTION

Electronic data processing equipment employing microelectronic circuitry requires regulated DC voltages for circuit operation. The desired DC voltage is obtained from a high voltage DC source by means of regulators with the regulated DC voltage requirements for EDP equipment tending more and more towards lower voltages and higher currents. For example, currents in kilo-amperes are being used at voltages as low as 3.3 volts DC. At these power levels, the efficiency of the power supplies becomes an important consideration.

The achievement of high electrical efficiency in EDP power supplies is complicated by the trend toward lower regulated voltage requirements. In switching voltage regulators, for example, which employ transformers and rectifiers for DC voltage regulation, the output circuit rectifiers account for a major part of the regulator power losses. Typically, these devices are fast recovery silicon rectifiers which exhibit a forward voltage drop of about 1.5 volts, or about half the value of the regulated output voltage. Consequently, the silicon rectifiers produce regulator power losses approaching half the value of the regulated output power.

Another rectifying device, the hot carrier or Schottky barrier diode, is now available and exhibits a forward voltage drop of only about 0.5 volt, as contrasted to the 1.5 volt drop of the silicon diode. While the device has been successfully employed in low power switching regulators, the reverse voltage limitation of the hot carrier diode prevents its use in many conventional high power switching regulators. The silicon diode can withstand reverse voltages of up to 45 or 50 volts, while the hot carrier or Schottky diode is limited to about 35 volts. In a conventional high current switching regulator employing linear reactors, as disclosed in U.S. Pat. No. 3,573,597, the operating voltages experienced by the output diodes are in excess of reverse voltage limitations of the hot carrier diode.

SUMMARY OF THE INVENTION

In accordance with the present invention a high power switching regulator is provided in which Schottky barrier diodes may be employed. Biased saturable reactors are employed instead of linear reactors in a circuit similar to that disclosed in U.S. Pat. No. 3,573,597, supra. Because the biased reactor produces flat-topped or square wave output current waveforms, as contrasted to saw-tooth current waveforms of linear reactors, no excessively high peak currents are encountered. Also, the transformer turns ratio may be altered to further reduce the voltage stress on the output diodes well below the limits of the hot carrier diodes. Further, the amplitude of the square wave current is dependent on the value of the bias current employed by the regulator which can be readily controlled.

Accordingly, an object of the present invention is an improved high power, low voltage switching regulator.

Another object of the invention is a high power switching regulator with reduced output current peaks.

Still another object of the invention is a high power switching regulator which may employ Schottky barrier diodes.

Yet another object of the invention is a switching regulator with output voltage which is independent of input voltage fluctuations.

Another object of the invention is a biased reactor power regulator with improved duty cycle.

A feature of the invention is the use of at least one pair of biased reactor transformers and at least one bias choke in combination with input commutating capacitors and output voltage rectifiers.

The invention and objects and features thereof will be more readily understood from the following detailed description and appended claims when taken with the drawings.

DESCRIPTION OF PREFERRED EMBODIMENTS

Figure 1:
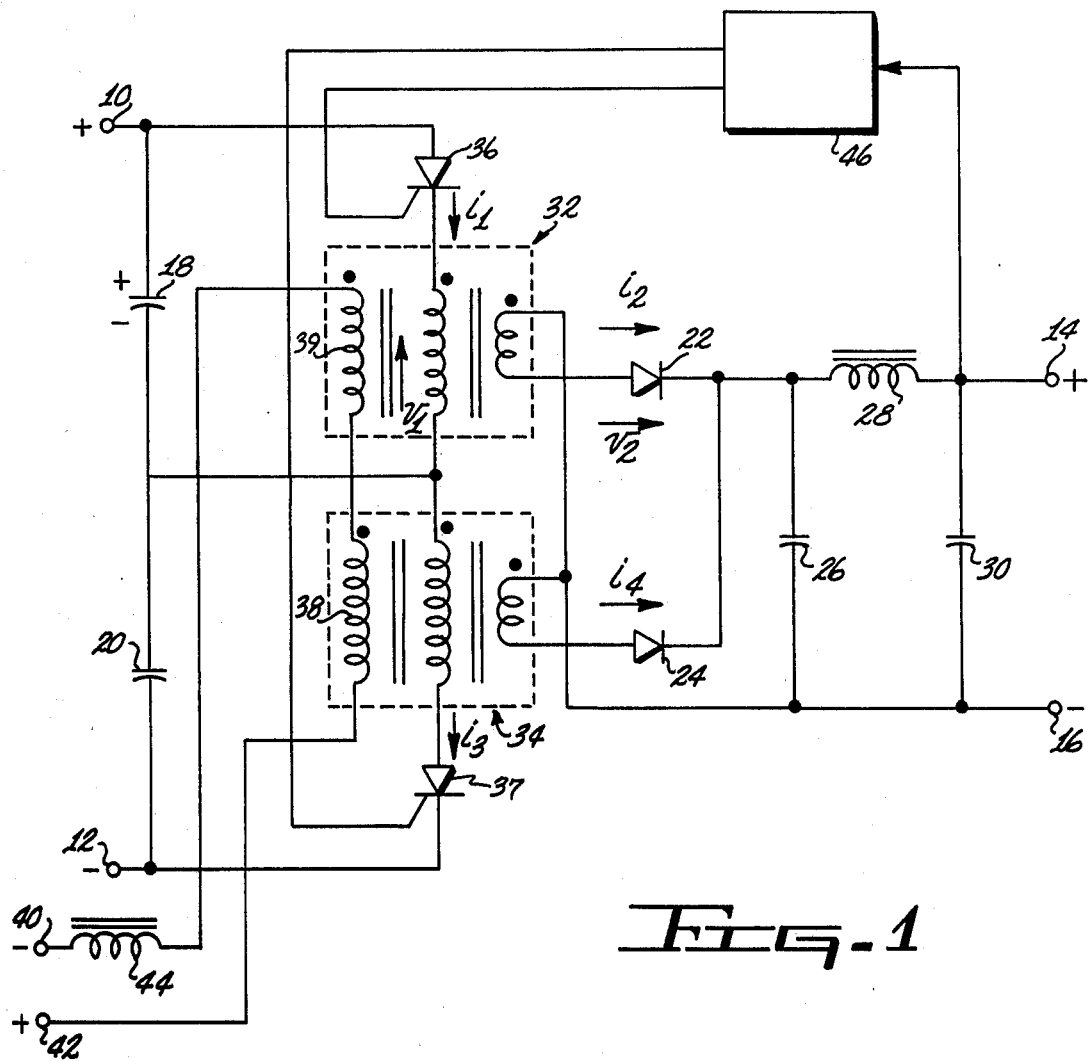
FIG. 1 is a schematic of one embodiment of a switching regulator in accordance with the present invention.

Referring now to the drawings, FIG. 1 is a schematic of a switching regulator in accordance with the present invention. An unregulated DC voltage source, e.g., 300 volts, is connected across input terminals 10 and 12 with polarities as shown and a desired regulated DC voltage, e.g., 3.3 volts, is obtained at terminals 14 and 16 with polarity as indicated. Serially connected across terminals 10 and 12 are two commutating capacitors 18 and 20, and connected to output terminals 14 and 16 is a rectification and filter circuit comprising diodes 22 and 24 having common cathodes connected to one terminal of shunt capacitor 26 and serial choke 28. The other end of serial choke 28 is connected to output terminal 14 with a shunt capacitor 30 connected across output terminals 14 and 16.

In accordance with the present invention at least one pair of biased saturable reactor transformers 32 and 34 each having a primary and a secondary winding provide voltage conversion between the common source across terminals 10 and 12 and the output voltage taken from terminals 14 and 16. A first silicon controlled rectifier (SCR) 36 is serially connected between input terminal 10 and a terminal of the primary winding of reactor 32, with a second silicon controlled rectifier 38 serially connecting the terminal of the primary winding of reactor 34 and input voltage terminal 12. The two primary windings are serially connected with the common terminal connected to the common terminal of capacitors 18 and 20. Serially connected bias windings 39 and 38 are coupled respectively to primary windings of reactors 32 and 34 with current for the bias windings being provided from a voltage source across terminals 40 and 42 through bias choke 44.

A feedback control circuit 46 receives a control voltage from output terminal 14 and provides the control signals to SCRs 36 and 38. The control circuit may include, by way of example, a unijunction transistor and an associated resistor-capacitor timing circuit as disclosed in U.S. Pat. No. 3,573,597, supra. The firing rate for the SCRs is established by means of the control circuit which senses the output voltage and compares the output voltage with a reference voltage and controls the firing rate as appropriate to regulate the output voltage, alternate gate trigger pulses going to SCR 36 and SCR 38. Under light load conditions the firing rate will be low and as the load increases a corresponding increase in firing rate will occur.

The secondary coil of transformer 32 is serially connected between output terminal 16 and the anode of rectifier 22, and the secondary coil of transformer 34 is serially connected between the output terminal 16 and the anode of rectifier 24.

For purposes of later circuit operation description, $v_1$ is the voltage across the primary coil of reactor 32, $v_2$ is the voltage across rectifier 22, $i_1$ is the current through the primary coil of transformer 32, $i_2$ is the current through rectifier 22, $i_3$ is the current through the primary coil of transformer 34, and $i_4$ is the current through rectifier 24.

Figure 2:
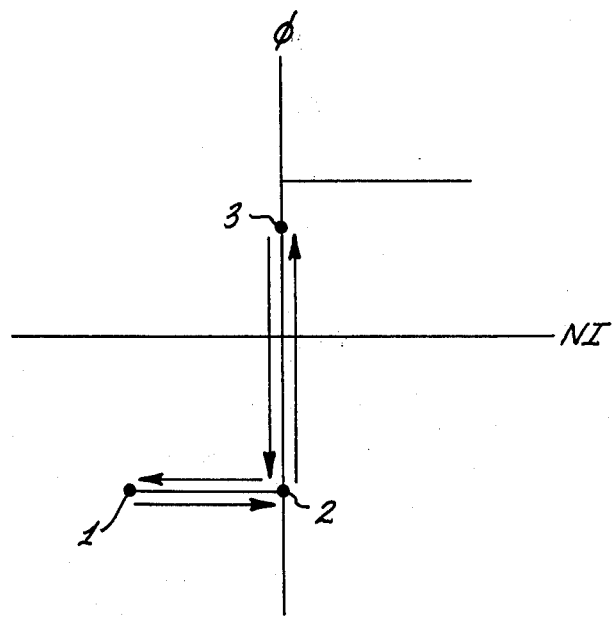
FIG. 2 is a flux diagram illustrating the operation of a biased saturable reactor transformer of the circuit of FIG. 1.

Operation of the voltage regulator of FIG. 1 will now be described with reference to the flux diagram of FIG. 2 and the current-voltage waveforms of FIG. 3. The flux diagram of FIG. 2 illustrates the operation of the magnetic core of transformer 32 through an operating cycle involving transformer 32, SCR 36, and rectifying diode 22. As indicated by the flux characteristics shown in FIG. 2, reactor 32 (and reactor 34) utilizes a square loop core material such as a high permeability ferrite or a tape wound nickel iron torrid.

Prior to the initiation of operation a DC input voltage, typically 300 volts, is connected across input terminals 10 and 12 and a source of bias current is connected across terminals 40 and 42. The input voltage source is assumed to have a very low AC impedance as typically afforded by a large input filter capacitor connected directly across terminals 10 and 12.

The bias current established in the bias windings 36 and 38 of transformers 32 and 34 sets the flux condition of the cores at point 1 of FIG. 2, which is a condition of magnetic saturation, with the displacement of point 1 from the vertical axis ($\phi$) being equal to the bias ampere-turns.

Figure 3:
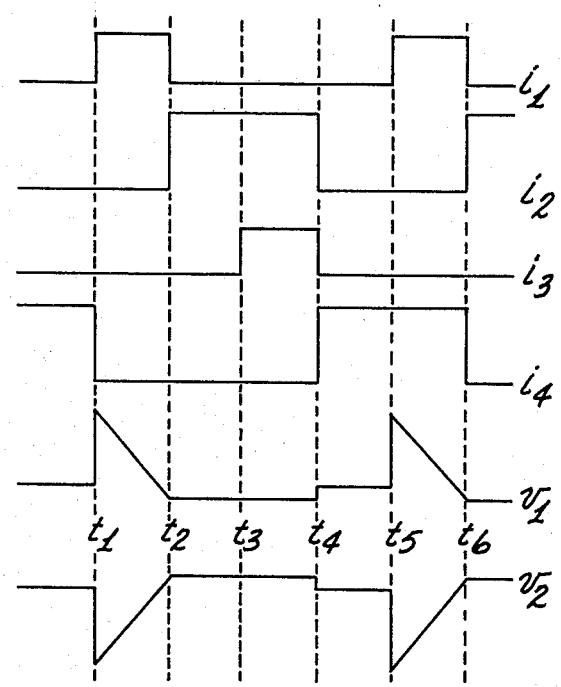
FIG. 3 is voltage and current waveforms for the circuit of FIG. 1.

Operation of the regulator circuit is initiated at time t1 of FIG. 3 by application of a positive gate signal to SCR 36, the gate signal being developed in feedback control circuit 46. At the instant of application of the gate signal, capacitor 18 has a charge of the polarity indicated by the plus and minus signs shown in FIG. 1. The positive gate signal causes SCR 36 to switch from a high impedance state to a low impedance state, and the initial voltage residing across capacitor 18 is impressed across the primary winding of transformer 32. Because of the square loop characteristic of the core of transformer 32, the initial impedance of transformer 32 is very low under a zero current condition of the primary winding, and primary current rises rapidly moving the operating point of the core as shown in FIG. 2 to the right from point 1 until the ampere-turns produced in the primary winding of reactor 32 has cancelled the bias ampere-turns. When this occurs, the operating point of the core will have moved from point 1 to point 2 of FIG. 2 and the current $i_1$ through the primary coil of transformer 32 will have risen from zero to a peak value as shown in FIG. 3.

When the operating point 2 is reached, the impedance of reactor 32 becomes very high, as evidenced by the nearly vertical portion of the flux curve of FIG. 2 between points 2 and 3. Thus, while the application of a voltage across the primary winding of reactor 32 necessitates a change of flux in the core, this change occurs with no further appreciable change in current required to produce the change in flux. Thus, during the period t1 to t2 of FIG. 3, the current $i_1$ remains essentially constant and the operating point of the reactor core moves from point 2 to point 3 of FIG. 2. The current supplied from commutating capacitor 18 (and from capacitor 20 which is effectively connected in parallel with capacitor 18 by virtue of the low AC impedance of the source connected across input terminals 10 and 12) discharges capacitor 18 from its initial positive charge condition at a constant rate, and the voltage $v_1$ impressed across the primary winding of reactor 32 falls off towards zero at the same constant rate, as indicated by the waveform for $v_1$ shown in FIG. 3.

At time t2, $v_1$ has passed through zero and has risen to a negative value of a magnitude such that the lower end of the secondary winding of transformer 32 has become sufficiently positive to forward bias rectifier 22. Capacitor 26 is now effectively connected across the secondary winding of reactor 32, and because capacitor 26 has an impedance many times lower than the impedance of capacitor 18, primary current $i_1$ falls rapidly to zero, as shown in FIG. 3, the conduction of SCR 36 is extinguished, and current $i_2$ through rectifier 22 rises abruptly. The rise in current $i_2$ produces in the secondary winding of transformer 32 an ampere-turn value equal to that which had been produced in the primary winding of reactor 32 to cancel the bias ampere turns.

During the time interval t1 to t2 energy from capacitors 18 and 20 had been transferred through the primary winding of reactor 32 to bias choke 44 where it was stored as inductive energy. Now during period t2 to t3 the stored energy is transferred from choke 44 through the secondary winding of transformer 32 for storage in the filter capacitor 26 as the operating point of the core of transformer 32 moves downward from point 3 toward point 2, as shown in FIG. 2. When the operating point again reaches point 2 the energy previously stored in choke 44 will have been released and transferred to capacitor 26, at which time the core operating point moves rapidly back to point 1 and the current $i_2$ through rectifier 22 falls rapidly to zero, as shown in FIG. 3. This concludes the first operating cycle.

The next cycle of operation is initiated by a positive gate signal delivered to SCR 38 by control circuit 46 at time t3 of FIG. 3. Currents $i_3$ and $i_4$ are generated at times t3 and t4, as shown, similar to the generation of currents $i_1$ and $i_2$ in the first cycle of operation, with the core of transformer 34 traversing the same pattern in FIG. 2 as that described for the core of transformer 32.

As above described, the firing rate for SCR 36 and SCR 38 is established by means of control circuit 46 which senses the output voltage developed across terminals 14 and 16. This voltage is compared with a reference voltage with the control circuit establishing a firing rate as appropriate to regulate the output voltage, with alternate SCR gate trigger pulses going to SCR 36 and SCR 38. As described, under light load conditions the firing rate will be low, and as the load increases a corresponding increase in firing rate occurs.

Figure 4:
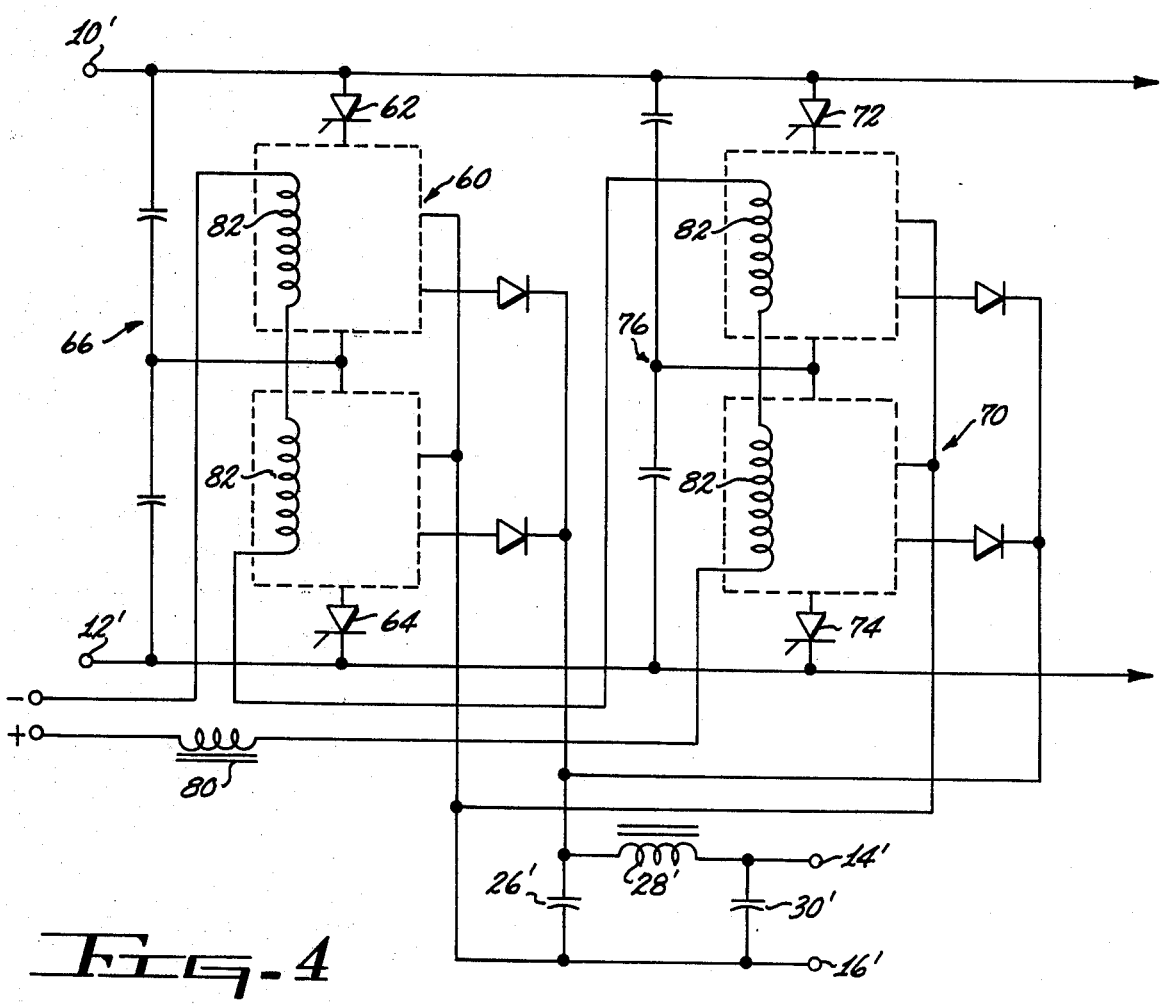
FIG. 4 is a schematic of an alternative embodiment of a switching regulator in accordance with the present invention.

While a single pair of biased saturable core transformers is used in the embodiment of FIG. 1, two or more pairs of reactors may be employed. FIG. 4 is a schematic of another embodiment of the voltage regulator in accordance with the present invention which employs a plurality of pairs of biased saturable core reactors but which is otherwise similar to the circuitry of FIG. 1. Like elements of the circuit of FIG. 4 are given prime numbers corresponding to the numbers of FIG. 1. In this embodiment a first pair of transformers 60 are serially connected with control rectifiers 62 and 64 across the input terminals 10' and 12' with a pair of commutating capacitors shown generally at 66 connected therewith. A second pair of biased saturable core transformers shown generally at 70 are serially connected with SCR 72 and SCR 74 across terminals 10' and 12' with a second pair of commutating capacitors 76 connected therewith. Additional pairs of transformers may be similarly connected across terminals 10' and 12' as indicated. While a plurality of pairs of transformers are employed a single bias choke and bias circuit may suffice in energizing the serially connected bias coils 82 associated with each transformer. However, if desired, separate bias circuitry and bias coils may be employed with each transformer pair.

The described embodiments offer an improved high power, low voltage switching regulator. Since output diode voltages are minimized, Schottky barrier diodes can be employed in high power applications. Improved duty cycle is achieved in this biased saturable core reactor regulator since recovery of energy stored in the bias choke during conduction of one controlled rectifier in a pair need not be realized prior to triggering the second controlled rectifier. The biased reactors and the square wave SCR and diode currents they produce permit higher average currents at lower peak values than experienced in the prior art high current regulators. The improved duty cycle and current waveforms permit a reduction in peak current amplitude for the controlled rectifiers for any power level, thus permitting the use of less expensive controlled rectifiers and the realization of improved electrical efficiency. Additionally, the cost of the bias circuit per watt of power is reduced since one bias choke can serve several pairs of biased output reactors. Furthermore, the amplitude of the current waveform is tightly controlled independent of regulator input voltage, the amplitude being dependent only upon the bias current which can be readily regulated.

While the invention has been described with reference to two embodiments, other modifications and changes may occur to those skilled in the art. For example, while only a single secondary or output winding is shown for each transformer in FIGS. 1 and 4, multiple output windings and multiple diodes may be utilized to achieve higher current ratings. Thus, the description is illustrative of the invention and is not to be construed as limiting the scope of the invention. Various modificatons and changes will occur to those skilled in the art without departing from the true spirit and scope of the invention as defined by the appended claims.

What is claimed is:

1. A switching regulator for providing a high current low voltage regulated output from a high voltage source comprising:
   a. first and second input terminals for receiving said high voltage source;
   b. first and second output terminals for said regulated output;
   c. capacitive commutating means connected across said first and second input terminals;
   d. first and second biased saturable reactor transformers each having a primary winding and a secondary winding;
   e. first and second control switching devices;
   f. mean serially connecting said first switching device, the primary winding of said first transformers, the primary winding of said second transformer, and said second switching device between said first and second input terminals and means connecting the common terminals of said primary windings to said commutating means;
   g. an output rectification and filter means including first and second Schottky Barrier Diode rectifiers, each of said rectifiers connected to a first terminal of a secondary winding of said first and second transformers and to an output terminal through capacitive-reactive filter means with conductive means connecting the other output terminal and the second terminals of said secondary windings;
   h. transformer reactor biasing means including first and second serially connected bias coils each magnetically coupled to a primary winding of said first and second transformers and a bias choke serially connected therewith for storing and transferring energy through said bias coils to said output rectification and filter means; and
   i. control signal means responsive to the output voltage and providing control signals to alternately render conductive said first and second controlled switching devices.

2. A switching regulator as defined by claim 1 and including
   third and fourth biased saturable reactor transformers each having a primary winding and a secondary winding and third and fourth controlled switching devices with means serially connecting said third switching device, the primary winding of said third transformers, the primary winding of said fourth transformer and said fourth switching device between said first and second input terminals;
   a second capacitive commutating means connected across said first and second input terminals with means connecting the common terminal of said primary windings of said third and fourth transformers to said second capacitive commutating means;
   a second output rectification and filter means connecting said third and fourth transformers to said first and second output terminals;
   transformer reactor biasing means including third and fourth serially connected bias coils each magnetically coupled to a primary winding of said third and fourth transformers and a bias choke serially connected therewith for storing and transferring energy through said bias coils to said second output rectification and filter means; and
   control signal means responsive to the output voltage and providing control signals to alternately render conductive said third and fourth controlled switching devices.

3. A switching regulator as defined by claim 2 wherein said second output rectification and filter means includes third and fourth rectifiers each connected to a first terminal of a secondary winding of said third and fourth transformers and to an output terminal through said capactive-reactive filter means defined in claim 1 and with conductive means connecting the other output terminal and the second terminals of said secondary windings of said third and fourth transformers.

4. A switching regulator as defined by claim 2 wherein one bias choke and said first, second, third and fourth bias coils are serially connected.

5. A switching regulator as defined by claim 2 wherein a first bias choke is serially connected with said first and second bias coils and a second bias choke is serially connected with said third and fourth bias coils.

6. A switching regulator as defined by claim 2 wherein a control signal means provides control signals to alternately render conductive said first, third, second, and fourth controlled switching devices.

7. A switching regulator as defined by claim 2 wherein each of said transformers includes a plurality of secondary windings.

* * * * *